US00RE48806E

(19) United States
(12) Reissued Patent
Fedele et al.

(10) Patent Number: US RE48,806 E
(45) Date of Reissued Patent: Nov. 2, 2021

(54) SPRING LOCK CLIP FOR COUPLING A CIRCUIT BOARD TO AN ELECTRICAL BASE

(71) Applicant: eLUMIGEN, LLC, Troy, MI (US)

(72) Inventors: Gennaro Fedele, West Bloomfield, MI (US); Mahendra Dassanayake, Bloomfield Hills, MI (US); Brian Petku, Clarkston, MI (US); Kevin Nalezyty, Warren, MI (US); Christopher Darr, Livonia, MI (US)

(73) Assignee: eLUMIGEN, LLC, Troy, MI (US)

(21) Appl. No.: 16/694,263

(22) Filed: Nov. 25, 2019

Related U.S. Patent Documents

Reissue of:
(64) Patent No.: 9,829,187
Issued: Nov. 28, 2017
Appl. No.: 14/878,249
Filed: Oct. 8, 2015

U.S. Applications:
(60) Provisional application No. 62/061,833, filed on Oct. 9, 2014.

(51) Int. Cl.
*F21V 23/06* (2006.01)
*H01R 43/20* (2006.01)
(Continued)

(52) U.S. Cl.
CPC ..... *F21V 23/06* (2013.01); *F21K 9/235* (2016.08); *F21V 23/006* (2013.01); *H01R 33/22* (2013.01);
(Continued)

(58) Field of Classification Search
CPC ..... F21K 9/235; F21K 9/238; F21V 23/006; H01R 33/22; H01R 33/94; H01R 33/9453; H01R 33/9456; H01R 43/205
See application file for complete search history.

(56) References Cited

U.S. PATENT DOCUMENTS 7,892,031 B1 2/2011 Mostoller et al.
8,142,227 B1 3/2012 Kuo
(Continued)

FOREIGN PATENT DOCUMENTS

CN 106797097 5/2017
EP 2459928 A1 6/2012
(Continued)

OTHER PUBLICATIONS

Chinese Office Action (w/English translation) dated May 22, 2020 in corresponding Chinese Application No. 201910635857.3 (9 pages).

(Continued)

*Primary Examiner* — James A Menefee
(74) *Attorney, Agent, or Firm* — Harness, Dickey & Pierce, P.L.C.

(57) ABSTRACT

An assembly includes a contact interface device, a lamp base and a circuit board. This device is connected to the circuit board and is used to bias the circuit board within the center of a cavity of a light bulb. This device contains two or more biasing portions that are connected to one another through a bridge portion. The biasing portions engage an interior threaded portion of the lamp base in order to lock into place and not allow the circuit board to move. The bridge portion allows the biasing portions to counteract one another and suspend the circuit board in the middle of the cavity of the light bulb.

17 Claims, 11 Drawing Sheets

(51) Int. Cl.

| | |
|---|---|
| ***H01R 33/22*** | (2006.01) |
| ***F21K 9/235*** | (2016.01) |
| ***H01R 33/945*** | (2006.01) |
| ***H01R 33/94*** | (2006.01) |
| ***F21V 23/00*** | (2015.01) |
| *H01R 103/00* | (2006.01) |

(52) U.S. Cl.
CPC ..... *H01R 33/94* (2013.01); *H01R 33/9453* (2013.01); *H01R 43/205* (2013.01); *H01R 2103/00* (2013.01)

(56) References Cited

U.S. PATENT DOCUMENTS

| | | | | |
|---|---|---|---|---|
| 2011/0028015 | A1* | 2/2011 | Mostoller | H01J 5/50 439/280 |
| 2012/0217861 | A1 | 8/2012 | Soni | |
| 2012/0275170 | A1* | 11/2012 | Li | F21V 29/773 362/373 |
| 2013/0257278 | A1 | 10/2013 | DeVore et al. | |
| 2015/0062928 | A1* | 3/2015 | Mostoller | F21K 9/23 362/363 |
| 2015/0070908 | A1* | 3/2015 | Yang | F21K 9/23 362/362 |
| 2015/0070910 | A1* | 3/2015 | Yang | F21K 9/23 362/363 |
| 2015/0097477 | A1* | 4/2015 | Fan | H05B 33/26 313/332 |

FOREIGN PATENT DOCUMENTS

| | | | |
|---|---|---|---|
| EP | 2532942 | A2 | 12/2012 |
| JP | 2008123737 | A | 5/2008 |
| WO | WO-2011014252 | A1 | 2/2011 |
| WO | WO-20130124925 | A1 | 8/2013 |

OTHER PUBLICATIONS

International Search Report and Written Opinion for Application No. PCT/US2015/054825, ISA/EP, Rijswijk, NL, dated Jan. 12, 2016.

* cited by examiner

SPRING LOCK CLIP FOR COUPLING A CIRCUIT BOARD TO AN ELECTRICAL BASE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of U.S. Provisional Application No. 62/061,833, filed on Oct. 9, 2014. The entire disclosure of the above application is incorporated herein by reference.

TECHNICAL FIELD

The present disclosure relates generally to a lighting assembly and, more specifically, an apparatus to electrically connect a circuit board with a power source.

BACKGROUND

This section provides background information related to the present disclosure which is not necessarily prior art.

A light bulb has a lamp base and housing. The lamp base is used to electrically connect the light bulb to the light socket. Some lamp bases screw into the light socket, whereas others may be pushed into the light socket or connected in a different way. The housing contains many different parts that are all used together to illuminate desired areas. The housing also has an outward facing portion, the outward facing portion being clear or shaded depending on the desired light output, which exposes the light on the desired area. Some of the parts within the housing include but are not limited to circuitry, wires, mechanical positioning devices and light sources. In order to maintain the functionality of the light, the circuit board (or the electrical conductors therein) is electrically connected to the base. This connection is made, for example, by soldering a wire to connect the electrical lamp base to the circuit board. The circuit board is then be secured within the lamp base so the circuit board cannot shift its position within the light while it is being moved.

In order to lower the manufacture time, a different method of securing the circuit board within the light bulb is set forth in order to increase the efficiency and productivity of the manufacturing process.

SUMMARY

This section provides a general summary of the disclosure, and is not a comprehensive disclosure of its full scope or all of its features.

In one aspect of the disclosure, an assembly comprises a circuit board having a first end and a second end, a lamp base having an interior threaded portion, and a contact interface. The contact interface further includes a first electrically conductive biasing portion, a second electrically conductive biasing portion and a bridge portion. The first electrically conductive biasing portion and second electrically conductive biasing portion engage the interior threaded portion of the lamp base and connect the lamp base and the circuit board. The bridge portion counterbalances a force produced by the first biasing portion and a force produced by the second biasing portion.

In another aspect of the disclosure, a method of forming electrical contacts within a lamp base comprises connecting a contact interface to the surface of a circuit board, where the contact interface has a first electrically conductive biasing portion, a second electrically conducting biasing portion and a bridge portion. A lamp base is then aligned with the circuit board. The circuit board is then inserted in an interior threaded portion of the lamp base to produce an electrical connection from the lamp base through the electrically conductive biasing portions to the circuit board.

Further areas of applicability will become apparent from the description provided herein. The description and specific examples in this summary are intended for purposes of illustration only and are not intended to limit the scope of the present disclosure.

DRAWINGS

DETAILED DESCRIPTION

Figure 1:
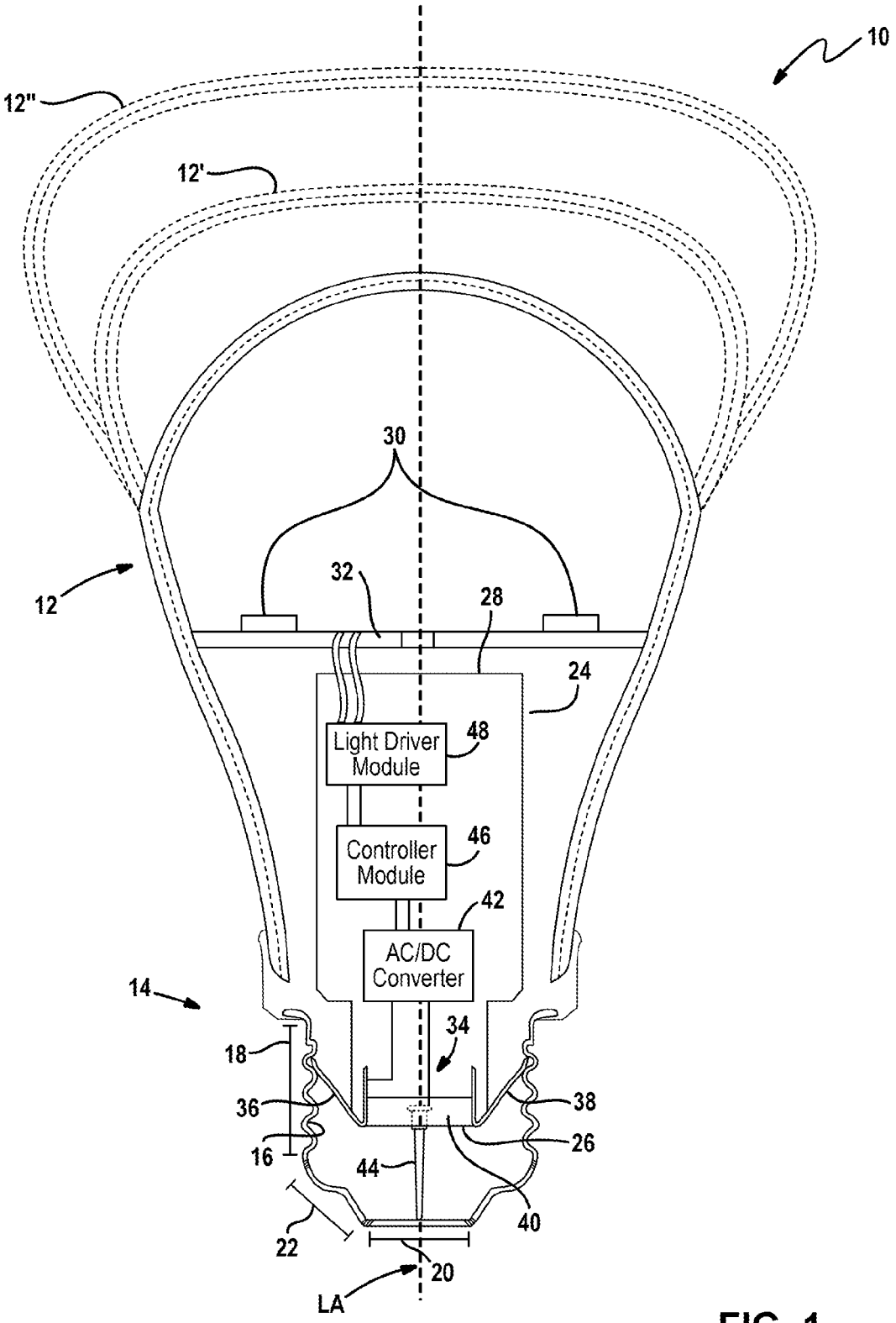
FIG. 1 is a cross-sectional view of a first assembly of a light according to the present disclosure.

The present disclosure will now be described fully herein with references to the accompanying figures, in which the various examples are shown. This disclosure may, however, be embodied in many different forms and should not be limited to the present disclosure, application or uses. For purpose of clarity, the same reference numbers will be used in the drawings to identify similar elements.

It should be noted that in the following figures, various components may be used interchangeably. For example, the circuit board illustrates one of many possible implementations of a light source circuit. This particular circuit board layout is for example purposes only and is not meant to limit the disclosure to this particular implementation.

Referring now to FIG. 1, a cross-sectional view of the assembly 10 is shown. This assembly includes a lamp base 14 and a housing portion 12. The lamp base 14 is used to connect the light bulb to the light socket and provide electrical energy to the light bulb. The housing portion 12 may come in different shapes and sizes, depending on the type of lighting conditions desired, the surface area being lit, and the shading or color of the light to be emitted from the light bulb. Alternative housing portions 12' and 12" are illustrated as alternative shapes. The housing may act as a cover to transmit light therethrough.

In one example, the assembly 10 has a circuit board 24 and a contact interface 34. The circuit board 24 may have a first end 26 and a second end 28. This circuit board 24 is used to drive light sources 30 from power supplied to the electrical lamp base 14. The light sources 30 may be mounted on a circuit board 32. The light sources 30 may be in direct communication with the circuit board 24, or the light sources 30 may have a separate circuit board 32 positioned within the housing 12 that is in communication with the circuit board 24. The light sources 30 may be LED light sources, lasers, or any light-emitting device known in the art.

The light assembly has a longitudinal axis LA that extends through the middle of the housing portion 12 and the base 14.

In this assembly 10, the circuit board 24 is connected to the base 14 through the contact interface 34. The contact interface 34 includes a first electrically conductive biasing portion 36 and a second electrically conductive biasing portion 38. These two separate biasing portions engage an interior threaded portion 16 of the lamp base 14 on opposite sides of the contact interface and suspend the circuit board 24 within the housing portion of the light assembly.

A force that is produced from the contact between the interior threaded portion 16 and the first biasing portion 36 counteracts a force that is produced between the second biasing portion 38 and the interior threaded portion 16 of the base 14 by means of a bridge portion 40 that connects the first biasing portion 36 to the second biasing portion 38.

The bridge portion 40 may be electrically conductive in order to allow the first biasing portion 36 to be in electrical communication with the second biasing portion 38. This bridge portion 40 may also be composed of a non-conductive material in order to insulate the first biasing portion 36 from the second biasing portion 38. This would be in circumstances where the electrical signal from the first biasing portion is different from the electrical signal of the second biasing portion and the points of contact of the respective biasing portions within the lamp base 14 are insulated from one another.

The bridge portion 40 is located on a bridge plane created between the first biasing portion 36 and the second biasing portion 38. This bridge plane runs parallel to a primary plane created between the first end 26 and second end 28 of the circuit board.

The contact interface 34 may facilitate a connection between the lamp base 14 and an AC/DC converter 42, which would also have an input from a prong or electrical contact 44 extending from the circuit board 24 to the base 14. The conductive portion 20 where electrical contact 44 contacts the base 14 is insulated from the parts of the lamp base 14 which are engaged by the first biasing portion 36 and second biasing portion 38 by insulating portion 22. The bridge portion 40 is suspended above the electrical contact 44. The AC/DC converter 42 may be in communication with a controller module 46. This controller module 46 may be used for many purposes, including but not limited to dimming the lights, turning the lights on and off, strobing the lights, setting a timer, etc. This controller module 46 may be in communication with a light driving module 48 which would be in direct communication with the light sources 30.

Figure 2:
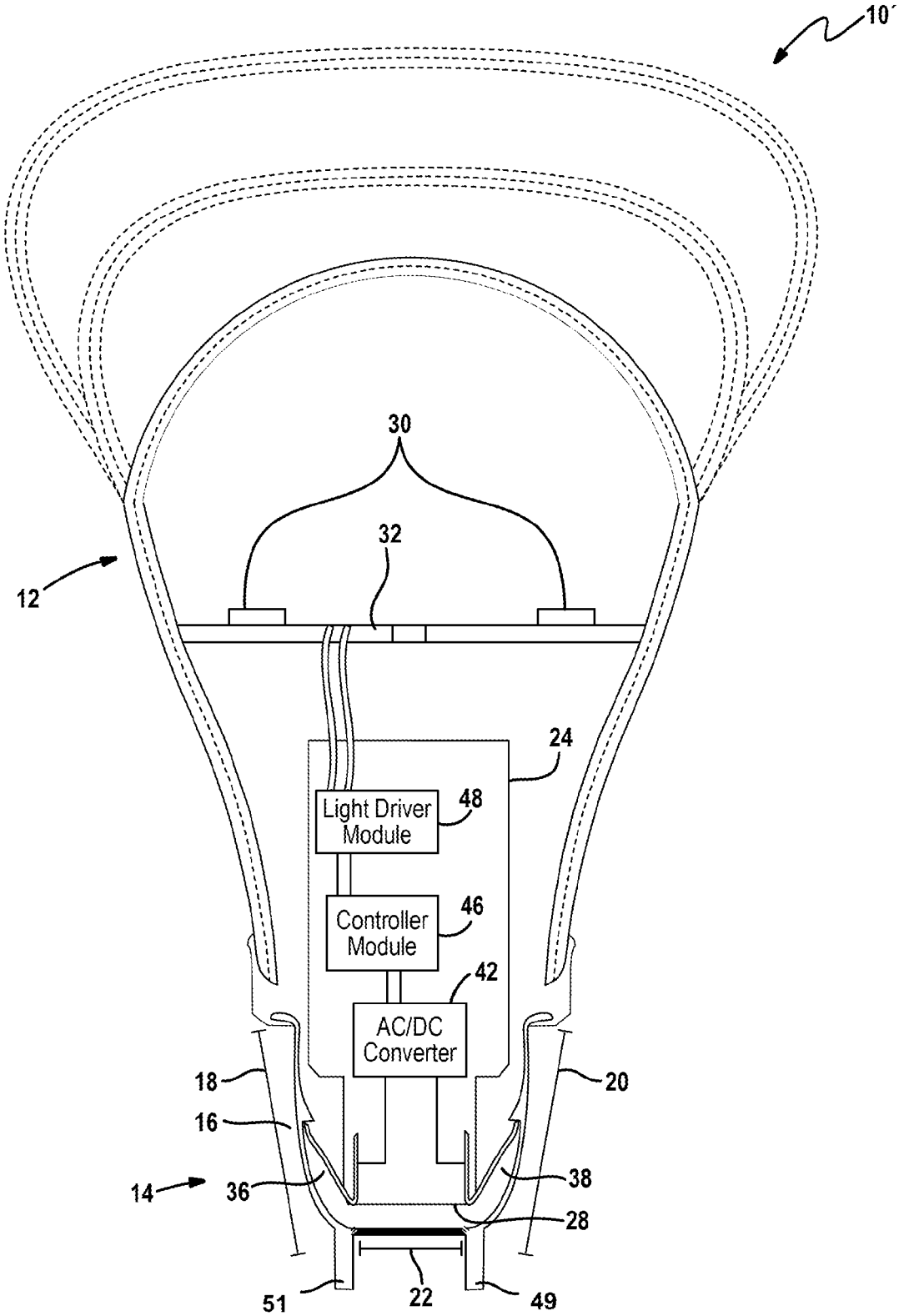
FIG. 2 is a cross-sectional view of a second assembly of a light according to the present disclosure.

Referring now to FIG. 2, a cross-sectional view of assembly 10' is shown. This assembly 10' is similar to the first assembly 10, with the exception that there is no bridge portion 40. A non-conducting (electrically) portion 22 separates the two conductive portions 18 and 20 of the base 14. A pair of contacts 49 and 51 may conduct different polarities or have different voltages.

Figure 3:
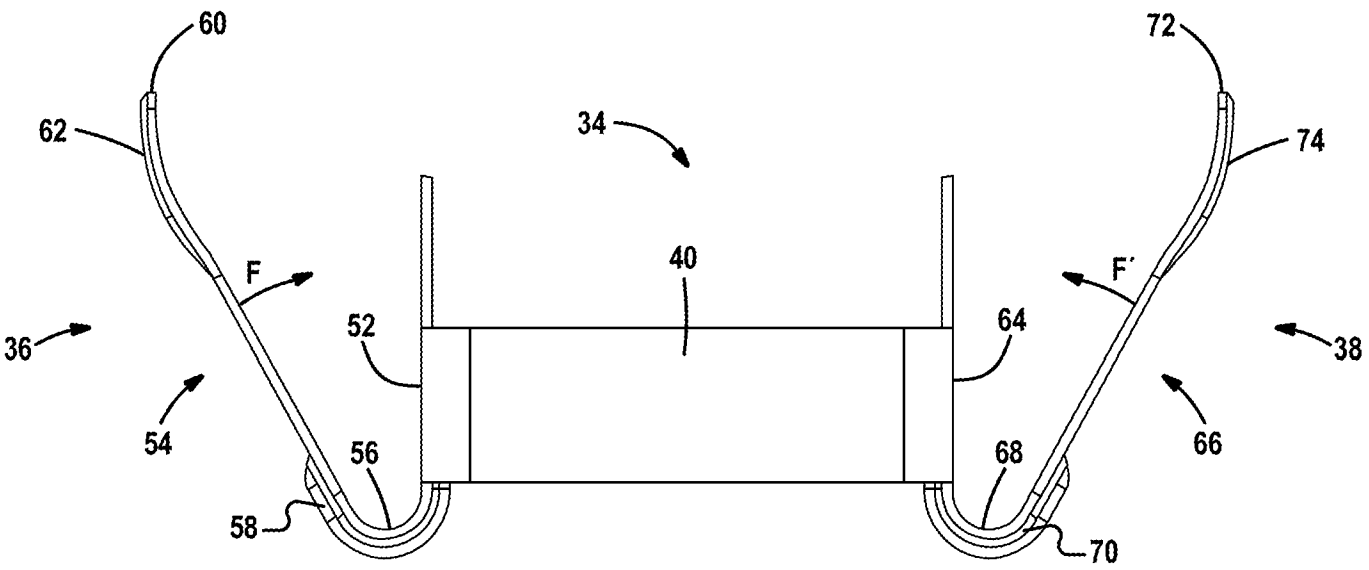
FIG. 3 is a top view of the contact interface.

Referring now to FIG. 3, the contact interface 34 is shown in greater detail from a top-view. The first biasing portion 36 may be divided in two separate sections; a first mounting portion 52 and a first engaging portion 54. The first mounting portion 52 extends perpendicular from the bridge portion 40. This first mounting portion 52 is used to electrically connect and mount the first biasing portion 36 to the circuit board 24. The first mounting portion 52 and the first engaging portion 54 are flexibly coupled. The first engaging portion 54 may flex in the direction F. The connection forms a V-shape between the first engaging portion 54 and the first mounting portion 52 at a first corned joint 56. The first corner joint 56 may have more than one surface contour 58 in order to aid in stability and make the shaping of the first biasing portion 36 easier in the manufacturing process.

The first engaging portion 54 has a first end 60 that may be in communication with the interior threaded portion of the base. The first end 60 and a second end, which is where the first engaging portion 54 is connected to the first mounting portion 52, form a first engaging plane that runs perpendicular to the primary plane and the bridge portion 40. The first engaging portion 54 may also have a first engaging bend 62. The first engaging bend 62, which bends first end 60 inward towards the bridge portion 40, may be used to allow a better contact between the first end 60 and the interior threaded portion of the lamp base. This is due to the engaging portion having better leverage against the threads of the lamp base.

Similarly, the second biasing portion 38 may also be divided into two separate sections; a second mounting portion 64 and a second engaging portion 66. The second mounting portion 64, like the first mounting portion 52, is used to electrically connect and mount the second biasing portion 38 to the circuit board 24. The second mounting portion 64 is also flexibly connected to the second engaging portion 66. That is, the second engaging portion may flex as indicated by arrow F'. This connection forms a V-shape between the second engaging portion 66 and the second mounting portion 64, and also forms a second corner joint 68. The second corner joint 68 may also have more than one surface contour 70 in order to aid in stability and make the shaping of the second biasing portion easier in the manufacturing process.

The second engaging portion 66 has a first end 72 that may be in communication with the interior threaded portion of the base. The first end 72 and a second end, which is where the second engaging portion 66 is connected to the second mounting portion 64, form a second engaging plane that runs perpendicular to the primary plane and the bridge portion 40. The second engaging portion 66 may also have a second engaging bend 74. The second engaging bend 74, which bends the first end 72 inward towards the bridge portion 40, may be used to allow a better contact between the first end 72 and the interior threaded portion of the lamp base.

The first engaging bend 62 and the second engaging bend 74 may also allow the contact interface 34 to sit tighter within the lamp base due to the first engaging portion and second engaging portion having a more stable contact end.

Figure 4:
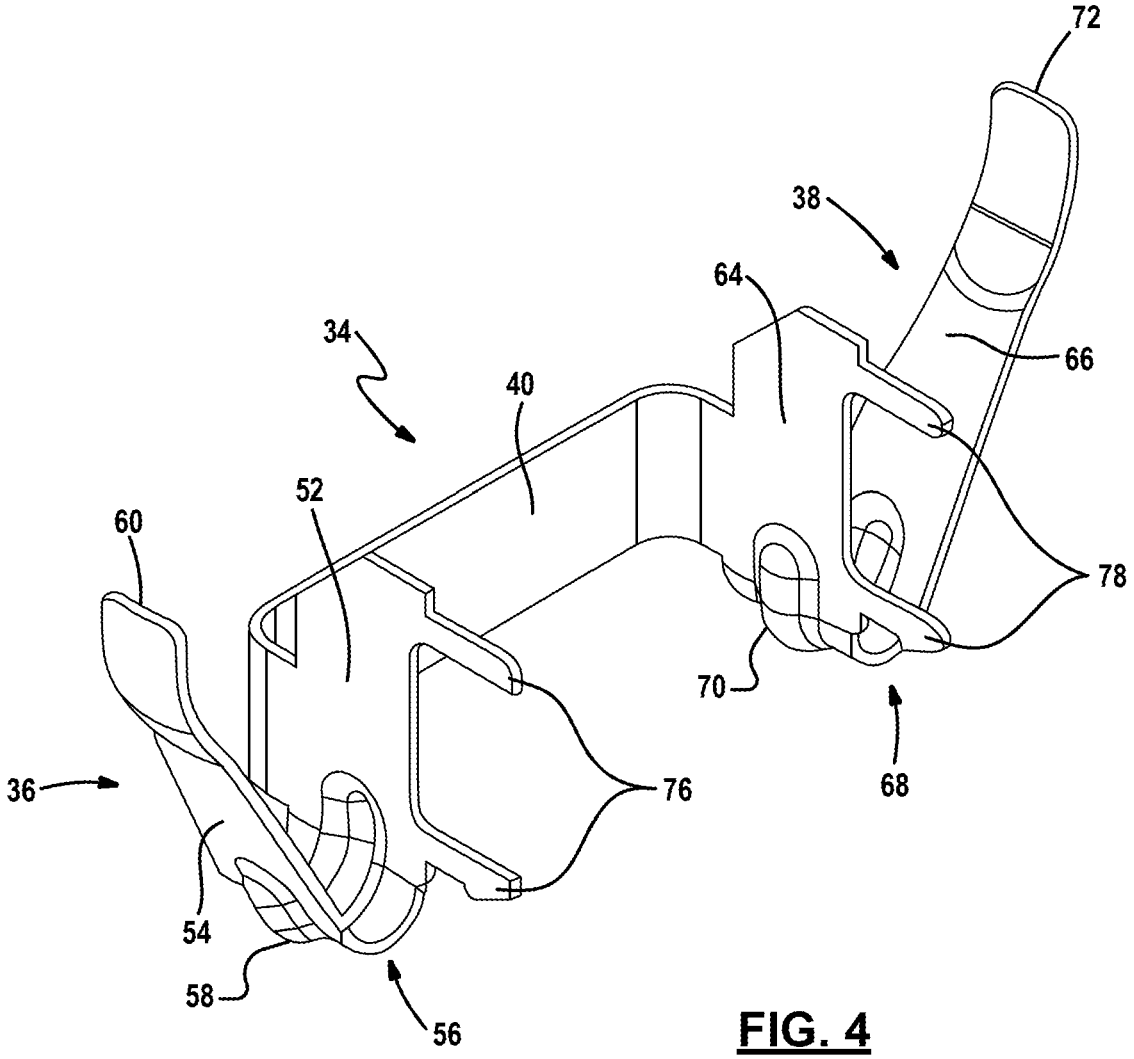
FIG. 4 is a perspective view of the contact interface.

Referring now to FIG. 4, a perspective view of the contact interface 34 is shown. The first mounting portion 52 has pins 76 for mounting to a circuit board. In a similar fashion, the second mounting portion 64 shows a means of attaching using pins 78. This particular view shows two sets of pins 76 and 78 being used, but a singular pin may be used on both sides or plurality of pins may be used.

Figure 5:
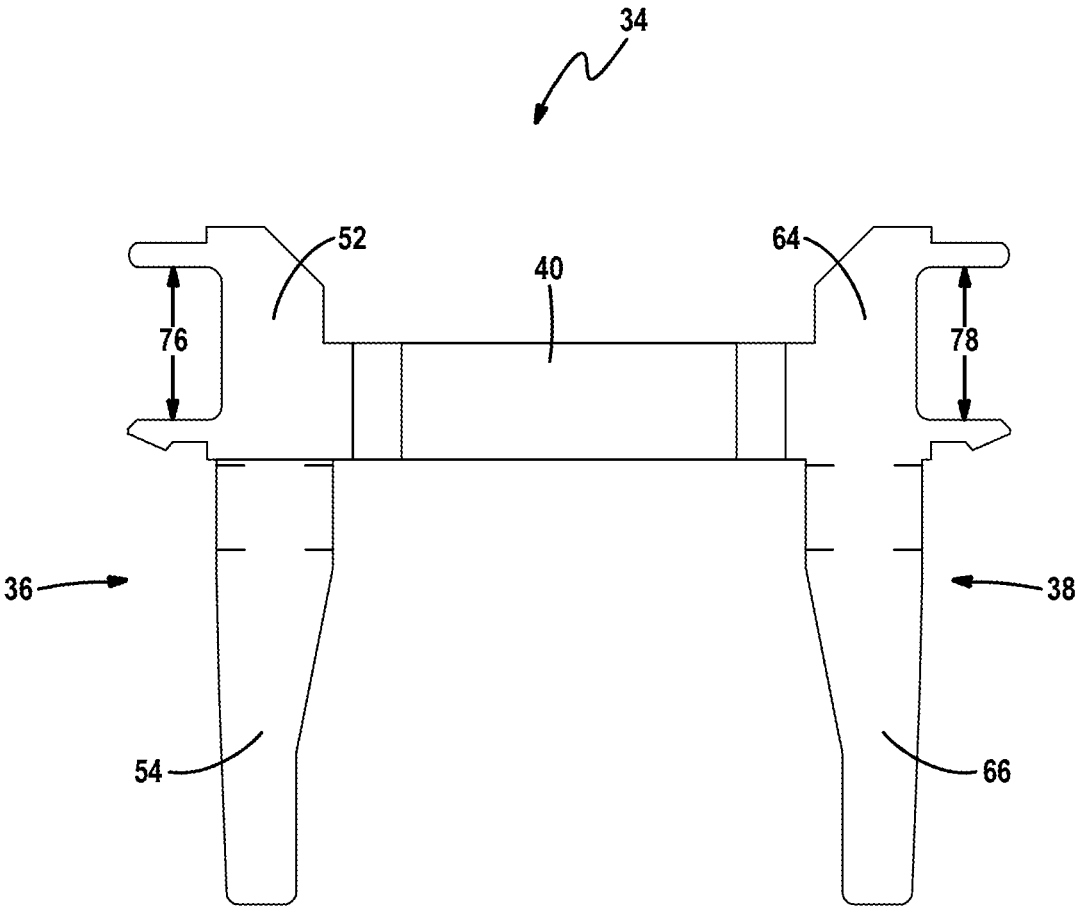
FIG. 5 is a top view of the contact interface before it has been shaped.

Referring now to FIG. 5, a top view of the contact interface 34 before it has been shaped is shown. This view shows that the first biasing portion 36, second biasing portion 38 and bridge portion 40 can be formed as a unitary structure. This unitary structure may be stamped using a die and a flat sheet of contact interface material. The stamped structure can then be bent into the desired shape. The contact interface 34 would need to be bent or shaped and attached to the circuit board.

Figure 6:
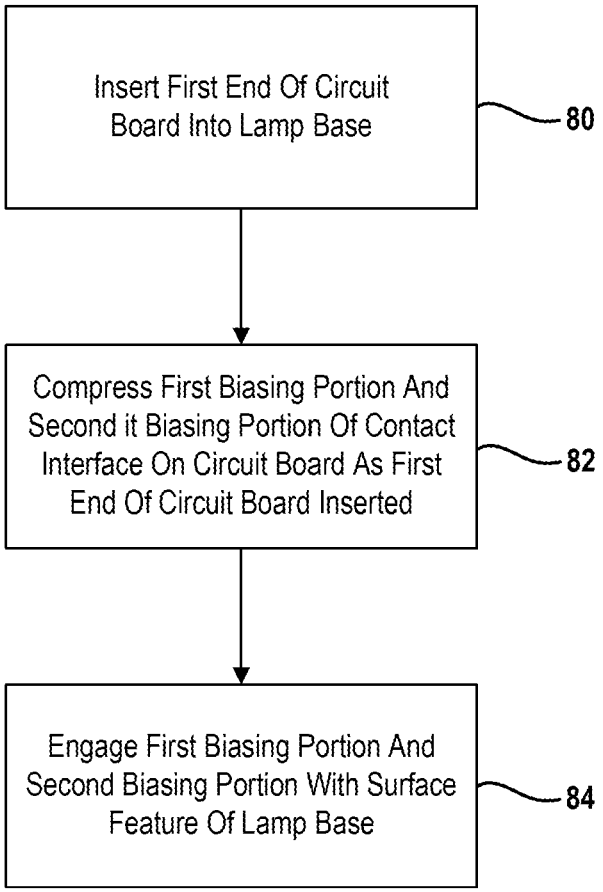
FIG. 6 is a flowchart describing the method of mounting and engaging the contact interface.

Referring now to FIG. 6, a flowchart is shown that describes a method of mounting and engaging the contact interface. This method begins by connecting the contact interface to the circuit board. Once the contact interface is connected to the circuit board, the circuit board and the lamp base may be aligned with one another so that the area where the contact interface is connected to the circuit board may be inserted to the interior portion the lamp base. When the circuit board is aligned with the lamp base, the circuit board may be inserted into the interior portion of the lamp base to allow the first biasing portion 36 and the second biasing portion 38 to engage the interior portion of the lamp base. Once the circuit board is inserted into the lamp base, the circuit board and lamp base are then inserted into the housing portion of the light assembly.

In step 80, the contact interface 34 may be mounted on the circuit board 24 by means of first soldering pins 76 and 78 to the circuit board 24. The pins 76 and 78 may be connected to the circuit board using a different method other than soldering, such as crimping, using connectors, or any other method to produce an electrical connection.

In step 82, once the contact interface 34 is connected to the circuit board 24, the circuit board 24 may then be held by a machine while the lamp base 14 is aligned with the circuit board 24.

In step 84, the method of inserting the circuit board into the base may be press-fitting into the interior of the lamp base to produce electrical contacts through the separate biasing portions. Steps 82 and 84 state inserting the circuit board into the base, then inserting the circuit board and base into the interior housing portion of the light bulb, but this order may be reversed depending on manufacturing needs and ease.

Figure 7A:
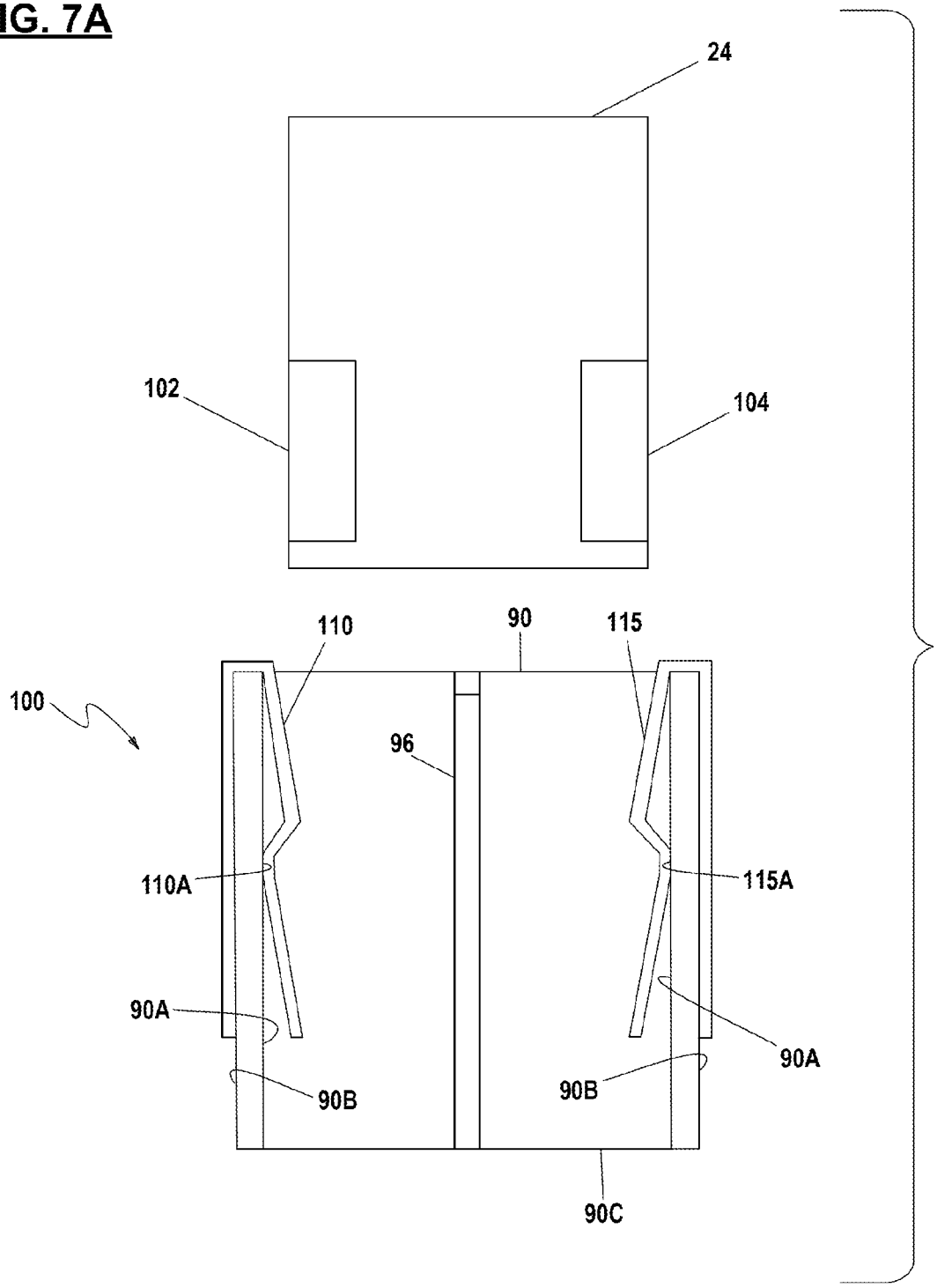
FIG. 7A is a cross-sectional view of a third example light assembly according to the present disclosure.
Figure 7B:
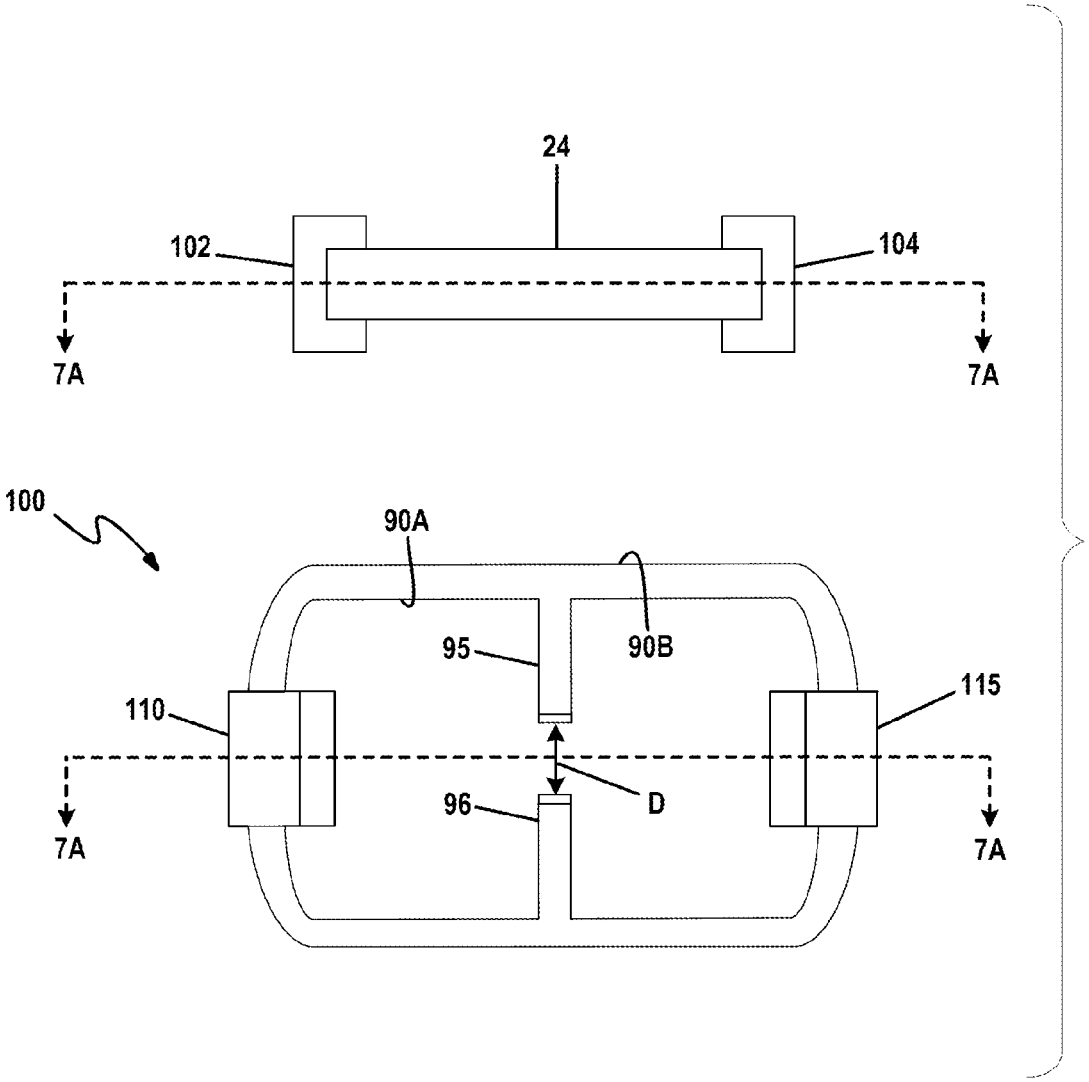
FIG. 7B is a top view of a third example light assembly according to the present disclosure.
Figure 7C:
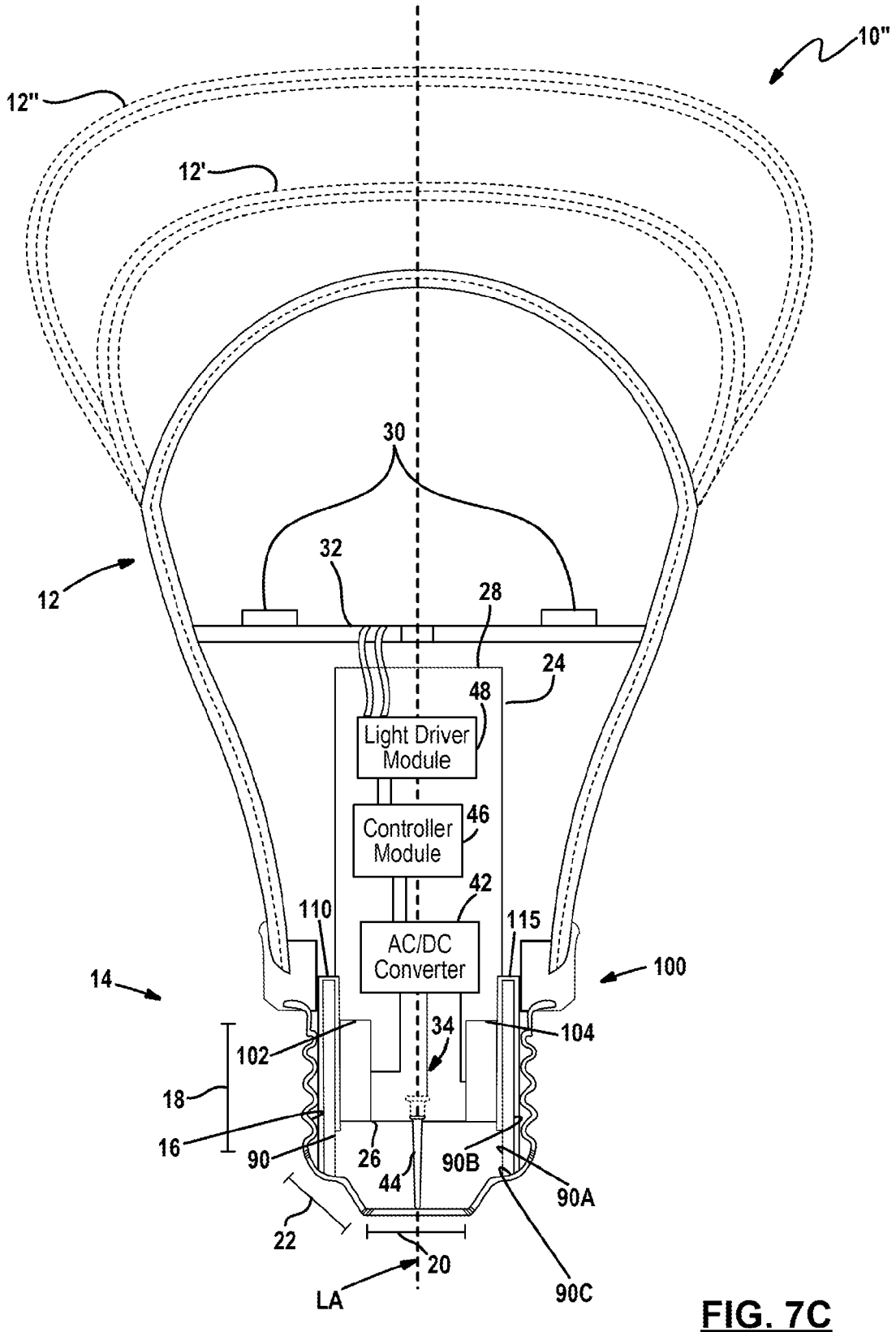
FIG. 7C is a cross-sectional view of a third example light assembly according to the present disclosure.

Referring now to FIGS. 7A-7C, a cross-sectional view of a third example light subassembly is shown according to the present disclosure. Elements with the same reference numbers in assembly 10" are functionally the same as those in assembly 10.

The third example comprises a subassembly 100 that includes a frame 90, a first biasing portion 110, and a second biasing portion 115. The first biasing portion 110 may be in contact with an inner surface 90A and an outer surface 90B of the frame 90. The second biasing portion 115 may be in contact with the inner surface 90A and the outer surface 90B of the frame 90. The first biasing portion 110 may be configured in a manner that allows for a flat portion 110A of the first biasing portion 110 to contact the inner surface 90A of the frame 90 when the circuit board 24 is not inserted into the subassembly 100. The second biasing portion 115 may be configured in a manner that allows for a second flat portion 115A of the second biasing portion 115 to contact the inner surface 90A of the frame 90 when the circuit board 24 is not inserted into the subassembly 100. Once the circuit board is inserted into the subassembly 100, the first biasing portion 110 and the second biasing portion 115 will have its entire surface in contact with the inner surface 90A of the frame 90, as described below.

In this example, the circuit board 24 comprises a first portion of a metal clip 102 and a second portion of a metal clip mounted to the circuit board. Once the circuit board 24 is inserted into the subassembly 100, the first portion of the metal clip 102 is electrically coupled to the first biasing portion 110. The second portion of the metal clip 104 is electrically coupled to the second biasing portion 115 once the circuit board 24 is inserted into the subassembly 100.

Referring now to FIG. 7B, a top view of the third example light assembly is shown according to the present disclosure. Elements with the same reference numbers in assembly 10" are functionally the same as those in assembly 10.

In this example, a first guide piece 95 and a second guide piece 96 may extend perpendicularly from the inner surface 90A of the frame 90. The first guide piece 95 and the second guide piece 96 may be separated by a predetermined distance D, such that the predetermined distance D is slightly larger than the thickness of the circuit board 24. Thus, the circuit board 24 can be inserted into the subassembly 100 between the first guide piece 95 and the second guide piece 96. The predetermined distance D may be chosen so that the circuit board 24 can securely maintain its position within the subassembly 100.

Referring now to FIG. 7C, a cross-sectional view of the third example light assembly 10" is shown according to the present disclosure. Elements with the same reference numbers in assembly 10" are functionally the same as those in assembly 10.

The base 14 has the first conductive portion 18 and the second conductive portion 20 in different positions on the base 14. The first conductive portion 18 conducts the first voltage from the light socket or receptacle to assembly 10". Similarly, the second conductive portion 20 conducts the second voltage from the light socket or receptacle to the assembly 10". The non-conductive portion 22 insulates the first conductive portion 18 from the second conductive portion 20.

Once the circuit board 24 is inserted into the subassembly 100, the circuit board 24 will force the entire surface of the first biasing portion 110 and the second biasing portion 115 each to contact the inner surface 90A of the frame 90. The frame 90 may have a flat base portion 90C that is in contact with the non-conductive portion 22 of the base 14.

When the circuit board 24 is inserted into the subassembly 100, the first portion of the metal clip 102 of the circuit board 24 is electrically coupled to the first conductive portion 18 through the first biasing portion 110 by engaging the surface feature such as the interior threaded portion 16 of the base 14. The second portion of the metal clip 104 of the circuit board 24 is electrically coupled to the first conductive portion 18 through the second biasing portion 115 by engaging the interior threaded portion 16 of the base 14. The circuit board 24 also is electrically coupled to the second conductive portion 20 through the electrical contact 44. The electrical contact 44 may be connected to the second conductive portion 20 by soldering the electrical contact 44 to the second conductive portion 20 or by using a compliant pin to make the connection.

Figure 8:
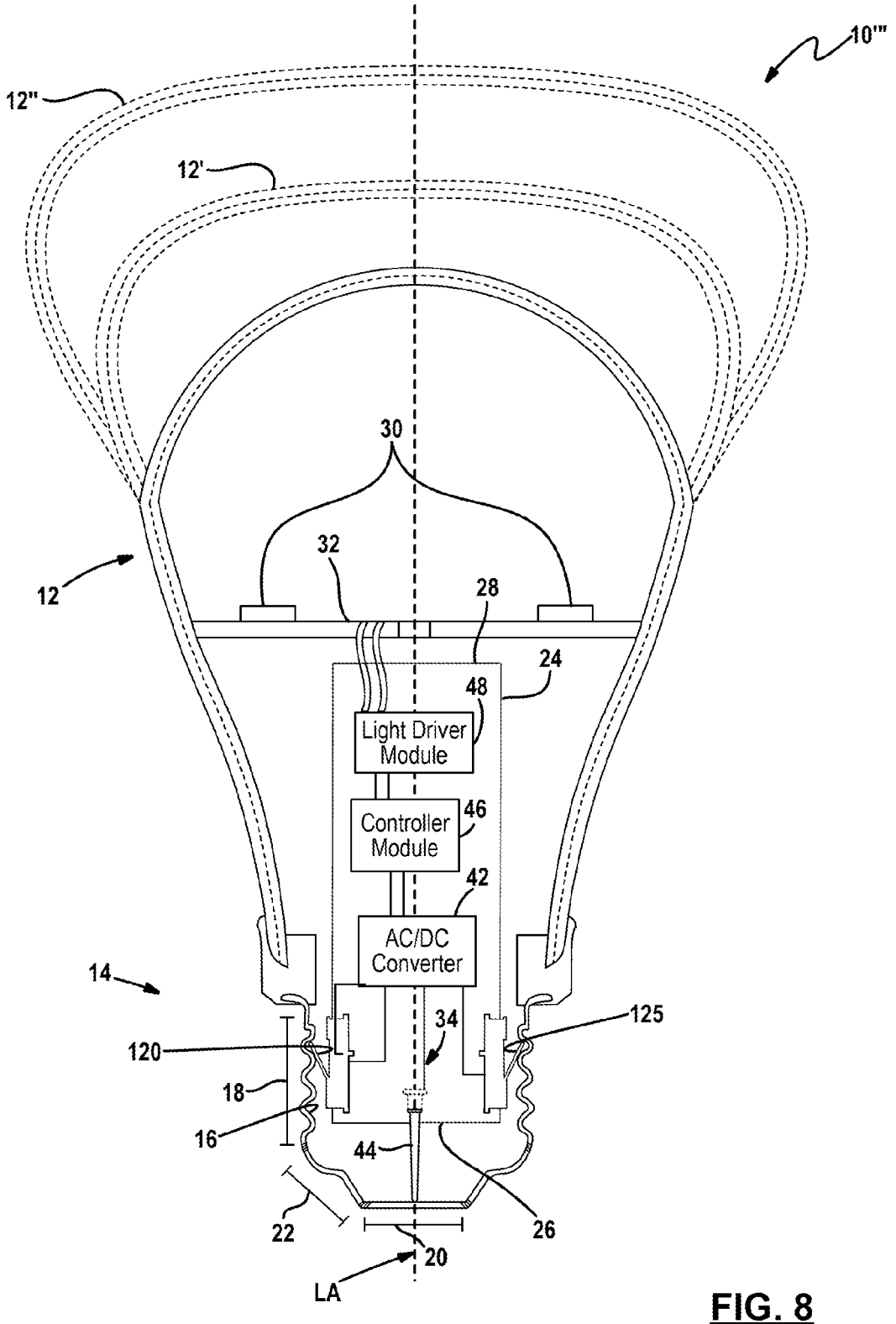
FIG. 8 is a cross-sectional view of a fourth example light assembly according to the present disclosure.

Referring now to FIG. 8, a fourth example of a cross-sectional view of assembly 10'" is shown using two soldered metal clips. Elements with the same reference numbers in assembly 10'" are functionally the same as those in assembly 10.

The base 14 has the first conductive portion 18 and the second conductive portion 20 in different positions on the base 14. The first conductive portion 18 conducts the first voltage from the light socket or receptacle to assembly 10'''. Similarly, the second conductive portion 20 conducts the second voltage from the light socket or receptacle to the assembly 10'''. The non-conductive portion 22 insulates the first conductive portion 18 from the second conductive portion 20.

In this example, a first biasing portion 120 and a second biasing portion 125 are implemented using two metal clips that are soldered to the circuit board 24. Thus, when the circuit board 24 is inserted into the base 14, the first biasing portion 120 and the second biasing portion 125 are electrically coupled to the first conductive portion 18 by engaging the surface feature 16 of the base 14. The circuit board 24 also becomes electrically coupled to the second conductive portion 20 through the electrical contact 44. The electrical contact 44 may be connected to the second conductive portion 20 by soldering the electrical contact 44 to the second conductive portion 20 or by using a compliant pin to make the connection.

Figure 9:
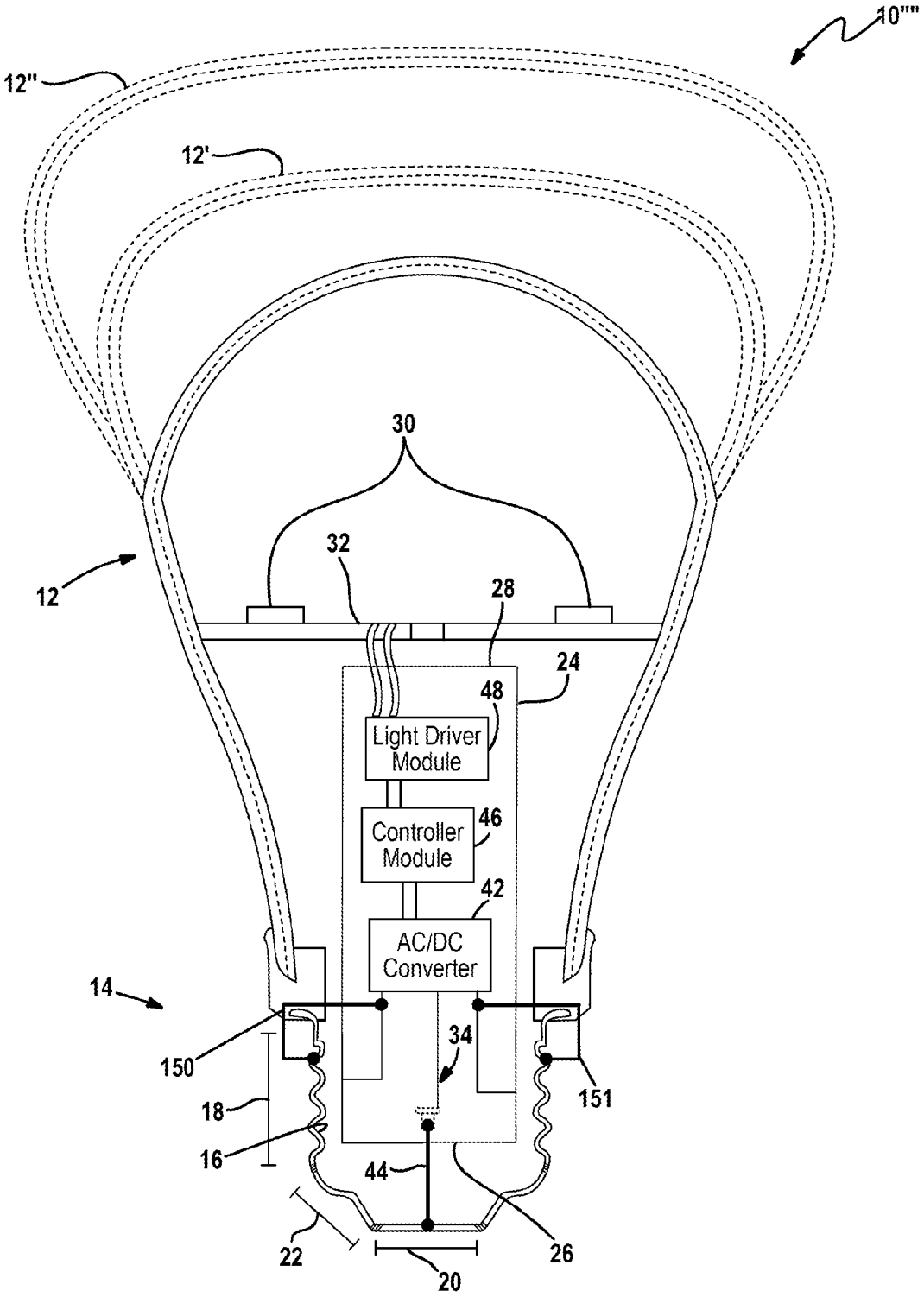
FIG. 9 is a cross-sectional view of a fifth example light assembly according to the present disclosure.

Referring now to FIG. 9, a fifth example of a cross-sectional view of assembly 10'''' is shown using wire contacts. Elements with the same reference numbers in assembly 10'''' are functionally the same as those in assembly 10.

The base 14 has the first conductive portion 18 and the second conductive portion 20 in different positions on the base 14. The first conductive portion 18 conducts the first voltage from the light socket or receptacle to assembly 10. Similarly, the second conductive portion 20 conducts the second voltage from the light socket or receptacle to the assembly 10''''. The non-conductive portion 22 insulates the first conductive portion 18 from the second conductive portion 20.

In this example, the first conductive portion 18 may be electrically coupled to the circuit board 24 by soldering a wire 150 at the interior threaded portion 16 of the base 14 and at the circuit board 24. An additional wire 151 may be soldered at the interior threaded portion 16 of the base 14 and at the circuit board 24 so that the first conductive portion 18 may be engaged. The electrical contact 44 may be implemented by soldering an additional wire at the first end 26 of the circuit board 24 and by soldering the additional wire 151 to the second conductive portion 20.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. An assembly comprising:

a circuit board having a first end and a second end, said circuit board disposed in a primary plane;

a lamp base having an interior [threaded] portion;

a contact interface comprising a first solder pin and a second solder pin that are soldered to the circuit board to fixedly couple the contact interface to the circuit board, said contact interface including:

a first electrically conductive biasing portion engaging the interior [threaded] portion of the lamp base and connecting the lamp base and the circuit board though the first solder pin;

a second electrically conductive biasing portion engaging the interior [threaded] portion of the lamp base and connecting the lamp base and the circuit board through the second solder pin; and a bridge portion coupling the first electrically conductive biasing portion and the second electrically conductive biasing portion and counterbalancing a force produced by the first biasing portion and a force produced by the second biasing portion, and wherein the bridge portion is mounted to create a bridge plane between the first biasing portion and the second biasing portion which extends parallel to the primary plane; and a conductive contact extending from the circuit board to the lamp base at a point electrically insulated from the interior [threaded] portion of the lamp base, wherein the bridge portion is suspended at a distance from the conductive contact to insulate the conductive contact from the bridge portion.

2. The assembly as described in claim 1, wherein connecting comprises electrically connecting and mechanically suspending the circuit board within the lamp base.

3. The assembly as described in claim 1, wherein the assembly further comprises a light source in communication with the circuit board.

4. The assembly as described in claim 1 where the bridge portion is electrically conductive.

5. The assembly as described in claim 4, wherein the first biasing portion, the bridge portion and the second biasing portion are all formed as a unitary structure, wherein the first biasing portion, bridge portion and second biasing portion are in electrical communication.

6. The assembly as described in claim 5, wherein the unitary structure is formed by means of stamping a die on a flat sheet of conductive material.

7. The assembly as described in claim 1, wherein the first biasing portion further comprises:

a first mounting portion extending perpendicular to the primary plane; and a first engaging portion having a first end in contact with the interior [threaded] portion of the lamp base and a second end connected to the first mounting portion, wherein the first end and the second end form a first engaging plane extending perpendicular to the primary plane.

8. The assembly as described in claim 7, where the first engaging portion and the first mounting portion are flexibly attached and form a V-shape.

9. The assembly as described in claim [1] *7*, wherein the second biasing portion further comprises:

a second mounting portion extending perpendicular to the primary plane; and a second engaging portion having a first end in contact with the interior [threaded] portion of the lamp base and a second end connected to the second mounting portion, wherein the first end and the second end form a second engaging plane extending perpendicular to the primary plane.

10. The assembly as described in claim 9 where the second engaging portion and the second mounting portion are flexibly attached and form a V-shape.

11. An assembly comprising:

a circuit board having a first end and a second end, said circuit board disposed in a primary plane;

a lamp base having an interior [threaded] portion;

a contact interface fixedly coupled to the circuit board, said contact interface including:

a first electrically conductive biasing portion engaging the interior [threaded] portion of the lamp base and connecting the lamp base and the circuit board;

a second electrically conductive biasing portion engaging the interior [threaded] portion of the lamp base and connecting the lamp base and the circuit board; and a bridge portion, composed of a non-conductive material, coupling the first electrically conductive biasing portion and the second electrically conductive biasing portion and counterbalancing a force produced by the first biasing portion and a force produced by the second biasing portion, and wherein the bridge portion is mounted to create a bridge plane between the first biasing portion and the second biasing portion which extends parallel to the primary plane; and a conductive contact extending from the circuit board to the lamp base at a point electrically insulated from the interior [threaded] portion of the lamp base, wherein the bridge portion is suspended at a distance from the conductive contact to insulate the conductive contact from the bridge portion.

12. The assembly as described in claim 11, wherein the bridge portion electrically insulates the first biasing portion from the second biasing portion.

13. A method of forming electrical contacts within a lamp base comprising:

connecting a contact interface comprising a first solder pin and a second solder pin that are soldered to the circuit board to fixedly couple the contact interface to the circuit board, said contact interface further comprising a first electrically conductive biasing portion, a second electrically conductive biasing portion and a bridge portion coupled to a surface of a circuit board so that the bridge portion is mounted to create a bridge plane between the first biasing portion and the second biasing portion which extends parallel to [the] *a* primary plane *of the circuit board* and a conductive contact extending from the circuit board to the lamp base at a point electrically insulated from the interior [threaded] portion of the lamp base, wherein the bridge portion is suspended at a distance from the conductive contact to insulate the conductive contact from the bridge portion;

aligning a lamp base with the circuit board;

inserting the circuit board in an interior [threaded] portion of the lamp base to produce an electrical connection from the lamp base through the electrically conductive biasing portions to the circuit board; and inserting the circuit board and the base into the interior of a housing portion of a light bulb.

14. The method of claim 13, [wherein the bridge portion connects] *further comprising connecting* the first biasing portion and the second biasing portion *with the bridge portion* to counterbalance a *first* force produced by the first biasing portion and a *second* force produced by the second biasing portion.

15. The method of claim [13] *14*, wherein [mounting] *connecting the first biasing portion* comprises electrically connecting and mounting.

16. The method of claim 15, [wherein] *further comprising electrically conducting through* the bridge portion [is electrically conductive and allows for] *to allow* electrical communication between the first electrically conductive biasing portion and the second electrically conductive biasing portion.

17. A method of forming electrical contacts within a lamp base comprising:

connecting a contact interface having a first electrically conductive biasing portion, a second electrically conductive biasing portion and a bridge portion to a surface of a circuit board so that the bridge portion is mounted to create a bridge plane between the first biasing portion and the second biasing portion which extends parallel to [the] *a* primary plane *of the circuit board* and a conductive contact extending from the circuit board to the lamp base at a point electrically insulated from the interior [threaded] portion of the lamp base, wherein the bridge portion is suspended at a distance from the conductive contact to insulate the conductive contact from the bridge portion and wherein the bridge portion electrically insulates the first electrically conductive biasing portion from the second electrically conductive biasing portion;

aligning a lamp base with the circuit board;

inserting the circuit board in an interior [threaded] portion of the lamp base to produce an electrical connection from the lamp base through the electrically conductive biasing portions to the circuit board; and inserting the circuit board and the base into the interior of a housing portion of a light bulb.

* * * * *